US011341663B2

(12) United States Patent
Gorodetsky et al.

(10) Patent No.: US 11,341,663 B2
(45) Date of Patent: May 24, 2022

(54) METHOD, SYSTEM AND APPARATUS FOR DETECTING SUPPORT STRUCTURE OBSTRUCTIONS

(71) Applicant: ZEBRA TECHNOLOGIES CORPORATION, Lincolnshire, IL (US)

(72) Inventors: Vlad Gorodetsky, North York (CA); Joseph Lam, North York (CA); Richard Jeffrey Rzeszutek, Toronto (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 97 days.

(21) Appl. No.: 16/429,516

(22) Filed: Jun. 3, 2019

(65) Prior Publication Data
US 2020/0380706 A1    Dec. 3, 2020

(51) Int. Cl.
*G06T 7/50* (2017.01)
*G06T 7/73* (2017.01)
(Continued)

(52) U.S. Cl.
CPC ............... *G06T 7/50* (2017.01); *G06T 7/75* (2017.01); *G06V 10/7553* (2022.01); *G06V 20/20* (2022.01)

(58) Field of Classification Search
CPC . G06T 7/50; G06T 2207/10028; G06T 7/593; G06T 7/74; G06T 7/70;
(Continued)

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

"Fair Billing with Automatic Dimensioning" pp. 1-4, undated. Copyright Mettler-Toledo International Inc.
(Continued)

*Primary Examiner* — Nimesh Patel

(57) ABSTRACT

A method in an imaging controller of detecting obstructions on a front of a support structure includes: obtaining (i) a point cloud of the support structure and an obstruction, and (ii) a support structure plane corresponding to the front of the support structure; for each of a plurality of selection depths: selecting a subset of points from the point cloud based on the selection depth; detecting obstruction candidates from the subset of points and, for each obstruction candidate: responsive to a dimensional criterion being met, determining whether the obstruction candidate meets a confirmation criterion; when the obstruction candidate meets the confirmation criterion, identifying the obstruction candidate as a confirmed obstruction; and presenting obstruction detection output data including the confirmed obstructions.

23 Claims, 11 Drawing Sheets

(51) Int. Cl.
*G06V 10/75* (2022.01)
*G06V 20/20* (2022.01)

(58) Field of Classification Search
CPC . G06T 2207/30196; G06T 2207/10016; G06T 7/20; G06T 17/00; G06T 2207/20081; G06T 2207/20084; G06T 2207/10004; G06T 2200/24; G06T 7/292; G06T 19/00; G06T 19/003; G06T 2200/08; G06T 7/248; G06T 19/006; G06T 17/05; G06T 2207/30242; G06T 7/0002; G06T 7/713; G06T 7/55; G06T 7/0004; G06T 2207/30164; G06T 2207/30168; G06T 2207/20024; G06T 2207/20052; G06T 2207/20056; G06T 7/223; G06T 2207/10021; G06T 2207/10024; G06T 5/006; G06T 7/73; G06T 2207/20021; G06T 2207/20221; G06T 7/11; G06T 1/0007; G06Q 10/087; G06Q 20/12; G06Q 30/0601; G06Q 30/0633; G06Q 30/0639; G06Q 30/0631; G06Q 30/0605; G06Q 10/0631; G06Q 10/06315; G06Q 10/083; G06Q 30/0281; G06Q 30/0641; G06Q 30/06; G06Q 30/0623; G06Q 30/0255; G06Q 30/0267; G06Q 30/0269; G06Q 30/0643; G06Q 20/02; G06Q 30/02; G06Q 50/28; G06Q 20/203; G06Q 30/0629; G06Q 20/208; G06Q 30/00; G06Q 20/201; G06Q 10/0633; G06K 9/00771; G06K 7/1413; G06K 9/00671; G06K 7/10821; G06K 9/00208; G06K 9/00624; G06K 9/00805; G06K 9/18; G06K 9/78; G06K 9/00617; G06K 9/6272; G06K 9/6211; G06K 2209/19; G06K 9/00791; G06K 9/6202; G06K 9/623; G06K 9/00604; G06K 9/6212; G06K 9/4628; G06K 9/4642; G06K 9/627; G06K 9/6217; G06K 9/22; G06K 9/6262; G06K 2209/01; G06K 2209/17; G06K 9/00201; G06K 9/325; G06K 9/6231; G06K 9/62; G06K 9/46; G06K 2209/27; G06K 7/10861; G06K 7/1456; G06K 9/00228; G06K 9/36; G06K 9/6215; G06K 9/6267; G06K 9/6274; G06K 9/209; G06K 9/00288; G06K 9/6201; G06K 7/10722; G06K 7/1417; G06K 9/00718; G06K 9/033; G06F 16/90335; G06F 21/606; G06F 3/048; G06F 16/29; G06F 16/53; G06F 2203/04803; G06F 3/0488; G06F 16/9554; G06F 3/0481; G06F 30/13; G06F 3/013; G06F 3/0484; G06F 16/55; G06F 16/583; G06F 17/18; G06F 16/245; G06F 16/248; G06F 16/285; G06F 16/9535; G06F 16/538; G06F 3/0304; G06F 3/0346; G06F 3/014; G06F 3/04845; H04W 4/021; H04W 4/02; H04W 4/029; H04W 4/30; H04W 4/33; H04W 4/40; H04W 4/80; H04W 4/024; A47F 10/04; A47F 13/00; A47F 2010/005; A47F 2010/025; A47F 3/08; A47F 9/045; G05B 19/048; G05B 19/124; G05B 2219/23363; G05B 2219/39107; G05B 19/042; G05B 19/0426; G05B 2219/23026; G05B 2219/25323; G06N 3/08; G06N 20/00; G06N 5/025; G06N 3/04; G06N 3/0454; G06N 7/005; G06N 3/088; G06N 3/006; G06N 3/02; G06N 3/126; G06N 3/0427; G06N 3/0436; G06N 5/003; G06N 5/022; G07F 7/0886; G07F 9/026; G07F 17/329; G07F 7/02; G07G 1/0081; G07G 1/0036; G07G 1/0054; G07G 1/0063; G07G 5/00; G05D 1/0088; G05D 1/0274; G05D 1/0212; G05D 1/0276; G05D 1/0246; G05D 1/0248; G05D 2201/0201; G05D 1/106; Y10S 901/01; Y10S 901/47; Y10S 901/03; Y10S 901/28; G09G 2340/125; G09G 2354/00; G09G 2380/00; G09G 5/373; G09G 5/377; A61B 5/0064; A61B 5/02444; A61B 5/1036; A61B 5/107; A61B 5/1071; A61B 5/1072; A61B 5/1074

See application file for complete search history.

(56) References Cited

U.S. PATENT DOCUMENTS

| | | |
|---|---|---|
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |

(56) References Cited

U.S. PATENT DOCUMENTS

| | | |
|---|---|---|
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |

(56) References Cited

U.S. PATENT DOCUMENTS

| | | |
|---|---|---|
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0223673 A1* | 8/2013 | Davis .............. G06Q 30/00 382/100 |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1* | 10/2015 | Rodriguez .......... G07G 1/0072 348/150 |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |

(56) References Cited

U.S. PATENT DOCUMENTS

| | | | |
|---|---|---|---|
| 2016/0253735 A1 | 9/2016 | Scudillo et al. | |
| 2016/0253844 A1 | 9/2016 | Petrovskaya et al. | |
| 2016/0260054 A1 | 9/2016 | High et al. | |
| 2016/0271795 A1 | 9/2016 | Vicenti | |
| 2016/0313133 A1 | 10/2016 | Zeng et al. | |
| 2016/0328618 A1 | 11/2016 | Patel et al. | |
| 2016/0328767 A1 | 11/2016 | Bonner et al. | |
| 2016/0353099 A1 | 12/2016 | Thomson et al. | |
| 2016/0364634 A1 | 12/2016 | Davis et al. | |
| 2017/0004649 A1 | 1/2017 | Collet Romea et al. | |
| 2017/0011281 A1 | 1/2017 | Dijkman et al. | |
| 2017/0011308 A1 | 1/2017 | Sun et al. | |
| 2017/0032311 A1 | 2/2017 | Rizzolo et al. | |
| 2017/0041553 A1 | 2/2017 | Cao et al. | |
| 2017/0054965 A1 | 2/2017 | Raab et al. | |
| 2017/0066459 A1 | 3/2017 | Singh | |
| 2017/0074659 A1 | 3/2017 | Giurgiu et al. | |
| 2017/0109940 A1 | 4/2017 | Guo et al. | |
| 2017/0147966 A1 | 5/2017 | Aversa et al. | |
| 2017/0150129 A1 | 5/2017 | Pangrazio | |
| 2017/0178060 A1 | 6/2017 | Schwartz | |
| 2017/0193434 A1 | 7/2017 | Shah et al. | |
| 2017/0219338 A1 | 8/2017 | Brown et al. | |
| 2017/0219353 A1 | 8/2017 | Alesiani | |
| 2017/0227645 A1 | 8/2017 | Swope et al. | |
| 2017/0227647 A1 | 8/2017 | Baik | |
| 2017/0228885 A1 | 8/2017 | Baumgartner | |
| 2017/0249491 A1* | 8/2017 | MacIntosh | G06K 7/1456 |
| 2017/0261993 A1 | 9/2017 | Venable et al. | |
| 2017/0262724 A1 | 9/2017 | Wu et al. | |
| 2017/0280125 A1 | 9/2017 | Brown et al. | |
| 2017/0286773 A1* | 10/2017 | Skaff | G06N 3/0454 |
| 2017/0286901 A1 | 10/2017 | Skaff et al. | |
| 2017/0323253 A1 | 11/2017 | Enssle et al. | |
| 2017/0323376 A1 | 11/2017 | Glaser et al. | |
| 2017/0337508 A1 | 11/2017 | Bogolea et al. | |
| 2018/0001481 A1 | 1/2018 | Shah et al. | |
| 2018/0005035 A1 | 1/2018 | Bogolea et al. | |
| 2018/0005176 A1 | 1/2018 | Williams et al. | |
| 2018/0020145 A1 | 1/2018 | Kotfis et al. | |
| 2018/0051991 A1 | 2/2018 | Hong | |
| 2018/0053091 A1 | 2/2018 | Savvides et al. | |
| 2018/0053305 A1 | 2/2018 | Gu et al. | |
| 2018/0075403 A1 | 3/2018 | Mascorro Medina et al. | |
| 2018/0089613 A1 | 3/2018 | Chen et al. | |
| 2018/0101813 A1 | 4/2018 | Paat et al. | |
| 2018/0108134 A1 | 4/2018 | Venable et al. | |
| 2018/0114183 A1 | 4/2018 | Howell | |
| 2018/0130011 A1 | 5/2018 | Jacobsson | |
| 2018/0143003 A1 | 5/2018 | Clayton et al. | |
| 2018/0174325 A1 | 6/2018 | Fu et al. | |
| 2018/0201423 A1 | 7/2018 | Drzewiecki et al. | |
| 2018/0204111 A1 | 7/2018 | Zadeh et al. | |
| 2018/0251253 A1 | 9/2018 | Taira et al. | |
| 2018/0276596 A1 | 9/2018 | Murthy et al. | |
| 2018/0281191 A1 | 10/2018 | Sinyayskiy et al. | |
| 2018/0293442 A1 | 10/2018 | Fridental et al. | |
| 2018/0306958 A1 | 10/2018 | Goss et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2018/0370727 A1 | 12/2018 | Hance et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0073559 A1 | 3/2019 | Rzeszutek et al. | |
| 2019/0073627 A1 | 3/2019 | Nakdimon et al. | |
| 2019/0077015 A1 | 3/2019 | Shibasaki et al. | |
| 2019/0087663 A1 | 3/2019 | Yamazaki et al. | |
| 2019/0094876 A1 | 3/2019 | Moore et al. | |
| 2019/0108606 A1 | 4/2019 | Komiyama | |
| 2019/0149725 A1* | 5/2019 | Adato | H04N 1/32144 348/158 |
| 2019/0178436 A1 | 6/2019 | Mao et al. | |
| 2019/0180150 A1 | 6/2019 | Taylor et al. | |
| 2019/0197728 A1 | 6/2019 | Yamao | |
| 2019/0236530 A1 | 8/2019 | Cantrell et al. | |
| 2019/0304132 A1 | 10/2019 | Yoda et al. | |
| 2019/0311486 A1* | 10/2019 | Phan | G06T 7/50 |
| 2019/0392212 A1 | 12/2019 | Sawhney et al. | |
| 2020/0279113 A1* | 9/2020 | Yanagi | G06Q 30/00 |
| 2020/0314333 A1 | 10/2020 | Liang et al. | |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.

(56) References Cited

OTHER PUBLICATIONS

Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France, [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al. "Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).

(56) References Cited

OTHER PUBLICATIONS

Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, vl91, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.

\* cited by examiner

METHOD, SYSTEM AND APPARATUS FOR DETECTING SUPPORT STRUCTURE OBSTRUCTIONS

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle in a retail facility for use in detecting product status information. The aisle may contain other objects, however, that may reduce the accuracy of status information detected from the captured data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
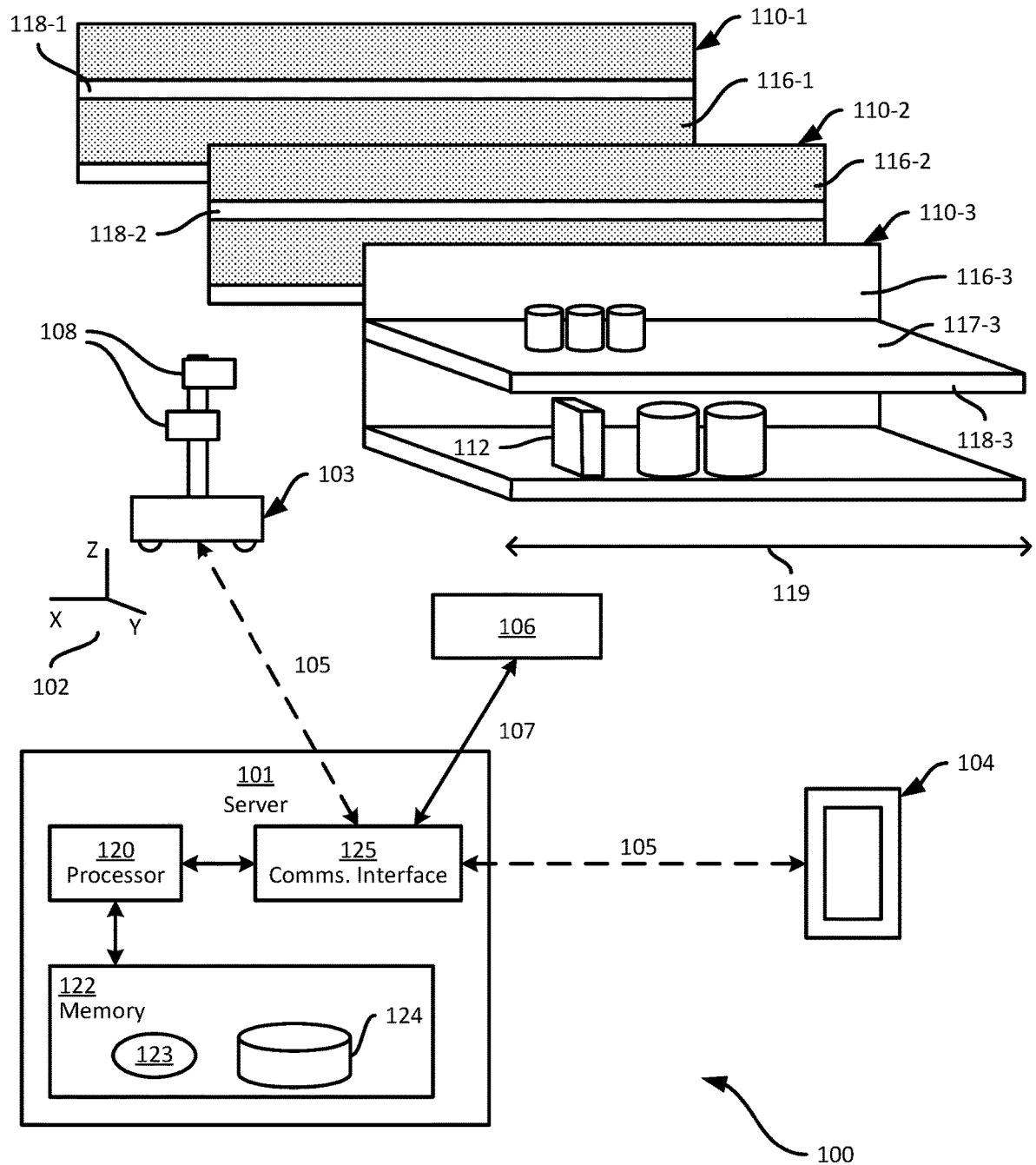
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in an imaging controller of detecting obstructions on a front of a support structure, the method comprising: obtaining (i) a point cloud of the support structure and an obstruction, and (ii) a support structure plane corresponding to the front of the support structure; for each of a plurality of selection depths: selecting a subset of points from the point cloud based on the selection depth; detecting obstruction candidates from the subset of points and, for each obstruction candidate: responsive to a dimensional criterion being met, determining whether the obstruction candidate meets a confirmation criterion; when the obstruction candidate meets the confirmation criterion, identifying the obstruction candidate as a confirmed obstruction; and presenting obstruction detection output data including the confirmed obstructions.

Additional examples disclosed herein are directed to a computing device, comprising: a memory; an imaging controller connected with the memory, the imaging controller configured to: obtain (i) a point cloud of the support structure and an obstruction, and (ii) a support structure plane corresponding to the front of the support structure; for each of a plurality of selection depths: select a subset of points from the point cloud based on the selection depth; detect obstruction candidates from the subset of points and, for each obstruction candidate: responsive to a dimensional criterion being met, determine whether the obstruction candidate meets a confirmation criterion; when the obstruction candidate meets the confirmation criterion, identify the obstruction candidate as a confirmed obstruction; and present obstruction detection output data including the confirmed obstructions.

Further examples disclosed herein are directed to a method in an imaging controller of detecting obstructions on a front of a support structure, the method comprising: obtaining a point cloud of the support structure; selecting a plurality of point subsets based on respective selection depths; detecting obstruction candidates in each point subset and, for each obstruction candidate: responsive to a decision criterion being met, determining whether the obstruction candidate meets a confirmation criterion; when the obstruction candidate meets the confirmation criterion, identifying the obstruction candidate as a confirmed obstruction; and presenting obstruction detection output data including the confirmed obstructions.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is also specifically designed, as will be discussed in detail herein, to detect certain types of obstructions on the shelf modules 110. Such obstructions can be provided to product status detection mechanisms (which may also be implemented by the processor 120 itself) to improve the accuracy of such product status detection mechanisms.

The processor 120 is interconnected with a non-transitory computer readable storage medium, such as a memory 122. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The memory 122 stores computer readable instructions for performing various functionality, including control of the apparatus 103 to navigate the modules 110 and capture shelf data, as well as post-processing of the shelf data. The execution of the above-mentioned instructions by the processor 120 configures the server 101 to perform various actions discussed herein. The applications stored in the memory 122 include an obstruction detection application 123 (also simply referred to as the application 123). The application 123 may also be implemented as a suite of logically distinct applications. each implementing a suitable portion of the functionality discussed below. In general, via execution of the application 123 or subcomponents thereof and in conjunction with other components of the server 101, the processor 120 performs various actions to detect, in data representing the shelves 110 (e.g. data captured by the apparatus 103), obstructions on the shelves 110.

The memory 122 can also store data for use in the above-mentioned control of the apparatus 103, such as a repository 124 containing a map of the retail environment and any other suitable data (e.g. operational constraints for use in controlling the apparatus 103, data captured by the apparatus 103, and the like).

The processor 120, as configured via the execution of the control application 128, is also referred to herein as an imaging controller 120, or simply as a controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the application 123 by the processor 120.

The server 101 also includes a communications interface 125 interconnected with the processor 120. The communications interface 125 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 125 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 125 for storage (e.g. in the repository 124) and subsequent processing (e.g. to detect obstructions on the shelves 110, as noted above). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
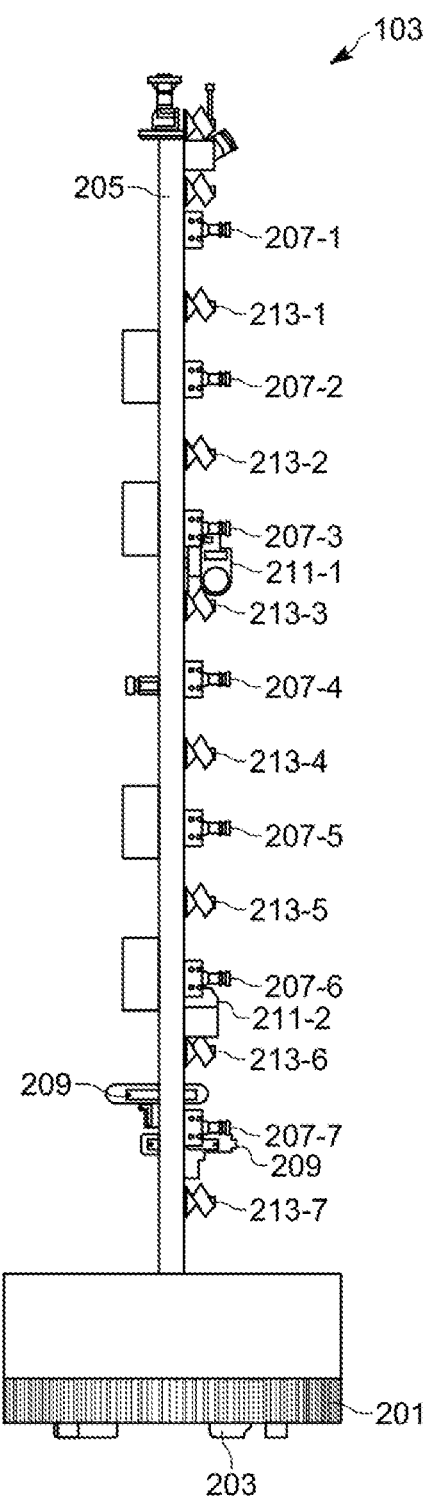
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
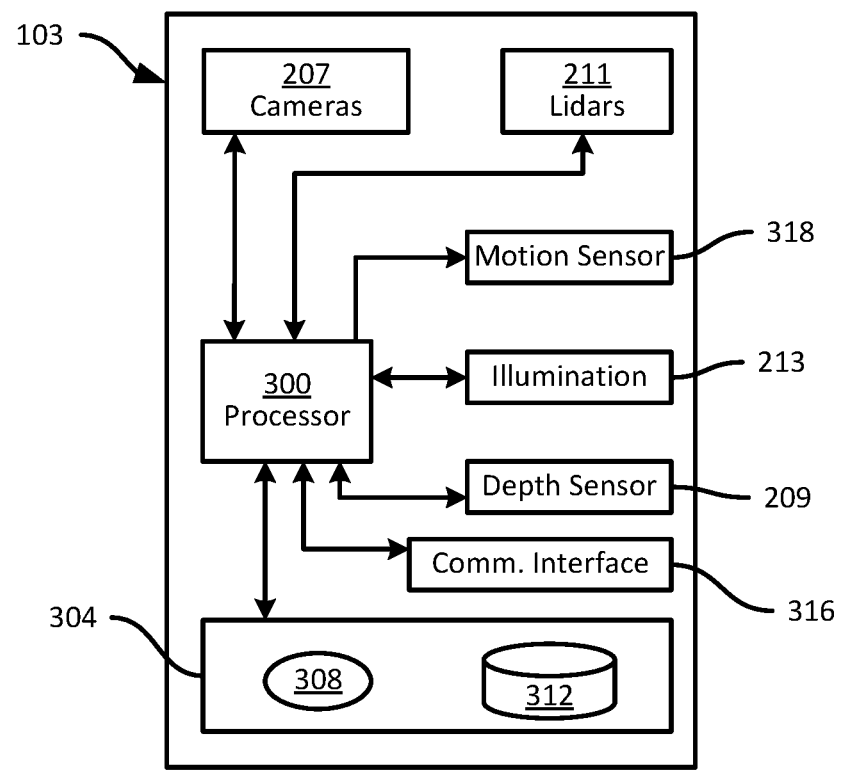
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, lidars 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores an apparatus control application 308 which, when executed by the processor 300, configures the processor 300 to perform various functions related to navigating the facility and controlling the sensors 108 to capture data, e.g. responsive to instructions from the server 101. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
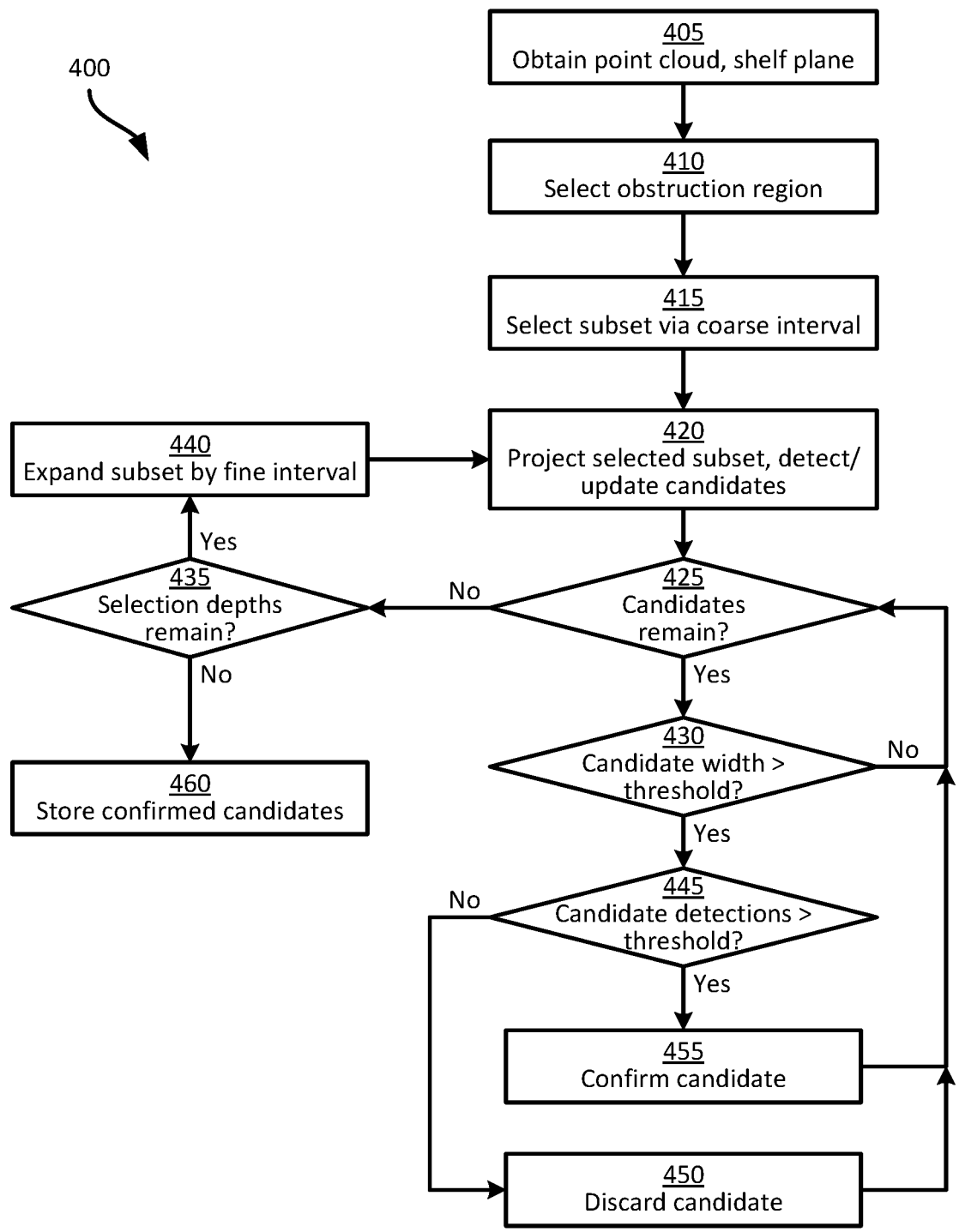
FIG. 4 is a flowchart of a method of detecting support structure obstructions in the system of FIG. 1.

The actions performed by the server 101, and specifically by the processor 120 as configured via execution of the application 123, to detect obstructions on the shelves 110 from captured data (e.g. by the apparatus 103) will now be discussed in greater detail with reference to FIG. 4. FIG. 4 illustrates a method 400 of detecting support structure obstructions. The method 400 will be described in conjunction with its performance in the system 100, and in particular by the server 101, with reference to the components illustrated in FIG. 1. As will be apparent in the discussion below, in other examples, some or all of the processing described below as being performed by the server 101 may alternatively be performed by the apparatus 103.

At block 405, the server 101 obtains a point cloud of the support structure. The server 101 also obtains a plane definition corresponding to the front of the support structure. In the present example, in which the support structures are shelves such as the shelves 110 shown in FIG. 1, the point cloud obtained at block 405 therefore represents at least a portion of a shelf module 110 (and may represent a plurality of shelf modules 110). The plane definition, also referred to herein as the support structure plane or the shelf plane, corresponds to the front of the shelf modules 110. In other words, the shelf plane contains the shelf edges 118.

The point cloud and shelf plane obtained at block 405 can be retrieved from the repository 124. For example, the server 101 may have previously received captured data from the apparatus 103 including a plurality of lidar scans of the shelf modules 110, and generated a point cloud from the lidar scans. Each point in the point cloud represents a point on a surface of the shelves 110, products 112, and the like (e.g. a point that the scan line of a lidar sensor 211 impacted), and is defined by a set of coordinates (X, Y and Z) in the frame of reference 102. The shelf plane may also be previously generated by the server 101 and stored in the repository 124, for example from the above-mentioned point cloud. For example, the server 101 can process the point cloud, the raw lidar data, image data captured by the cameras 207, or a combination thereof, to identify shelf edges 118 according to predefined characteristics of the shelf edges 118. Examples of such characteristics include that the shelf edges 118 are likely to be substantially planar, and are also likely to be closer to the apparatus 103 as the apparatus 103 travels the length 119 of a shelf module 110) than other objects (such as the shelf backs 116 and products 112). The shelf plane can be obtained in a variety of suitable formats, such as a suitable set of parameters defining the plane. An example of such parameters includes a normal vector (i.e. a vector defined according to the frame of reference 102 that is perpendicular to the plane) and a depth (indicating the distance along the normal vector from the origin of the frame of reference 102 to the plane).

Figure 5:
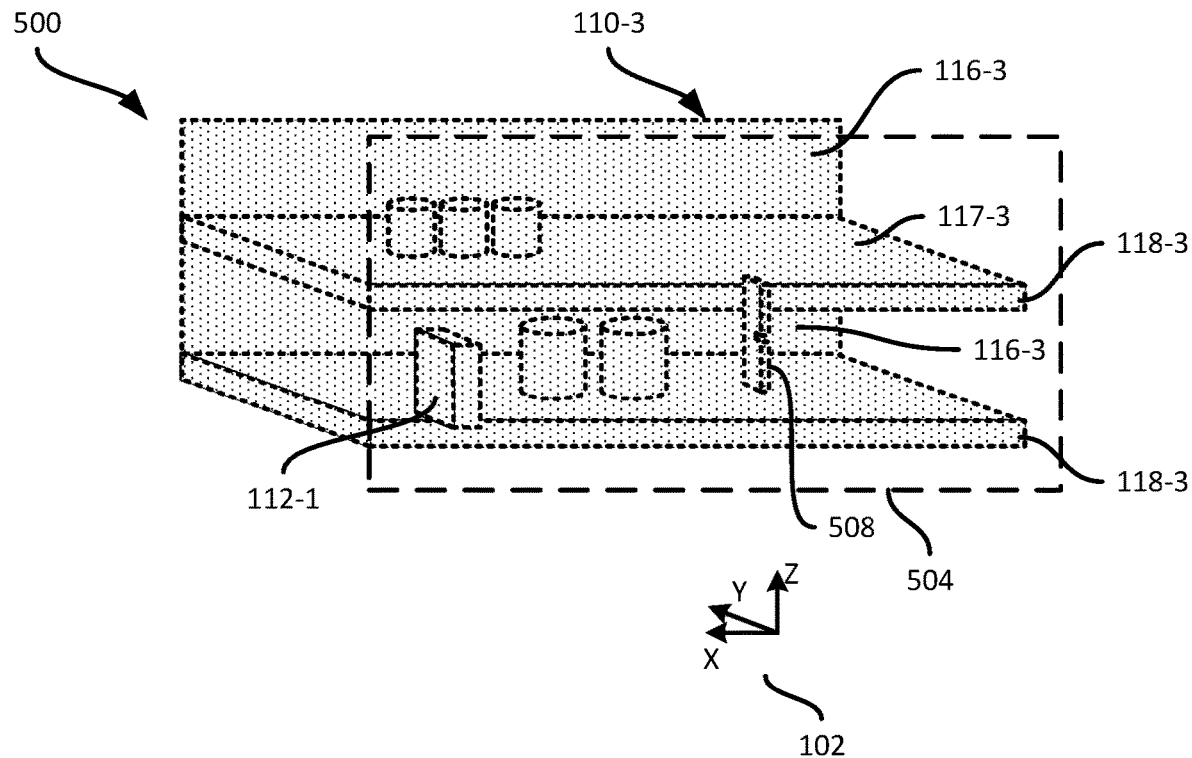
FIG. 5 is a diagram illustrating a point cloud to be processed via the method of FIG. 4.

Referring to FIG. 5, a point cloud 500 is illustrated, depicting the shelf module 110-3. The shelf back 116-3, as well as the shelf 117-3 and shelf edge 118-3 are therefore shown in the point cloud 500. Also shown in FIG. 5 is a shelf plane 504 corresponding to the front of the shelf module 110-3 (that is, the shelf plane 504 contains the shelf edges 118-3). The point cloud 500 and the shelf plane 504 need not be obtained in the graphical form shown in FIG. 5. As will be apparent to those skilled in the art, the point cloud may be obtained as a list of coordinates, and the shelf plane 504 may be obtained as the above-mentioned parameters. Example products 112 are also shown in FIG. 5, including a box 112-1, a portion of which extends forwards beyond the shelf edge 118-3.

Further, the point cloud 500 depicts an obstruction in the form of a clip strip 508 hanging from or otherwise supported by the shelf edge 118-3. The clip strip 508 may hold coupons, samples or the like, and as shown in FIG. 5, extends into the aisle from the front of the shelf module 110-3. As will be discussed below, the server 101 processes the point cloud 500 to detect the clip strip 508 (that is, to identify the position of the clip strip 508 according to the frame of reference 102). Performance of the method 400 also enables the server 101, as will be apparent in discussion below, to detect various other forms of obstacles supported in front of the shelves 110.

Referring again to FIG. 4, at block 410 the server 101 can select a set of points from the point cloud 500, corresponding to an obstruction region. As noted above, the clip strip 508 and other obstructions detectable via performance of the method 400 extend forwards, into the aisle, from the shelf modules 110. In other words, the obstructions are assumed to appear in an obstruction region in front of the shelf plane 504. To reduce the computational load imposed on the server 101 during the performance of the method 400, the server 101 can therefore select a set of points that correspond to the above-noted obstruction region. In other examples, block 410 can be omitted, and the server 101 can process the entire point cloud 500 in the remainder of the method 400.

Figure 6:
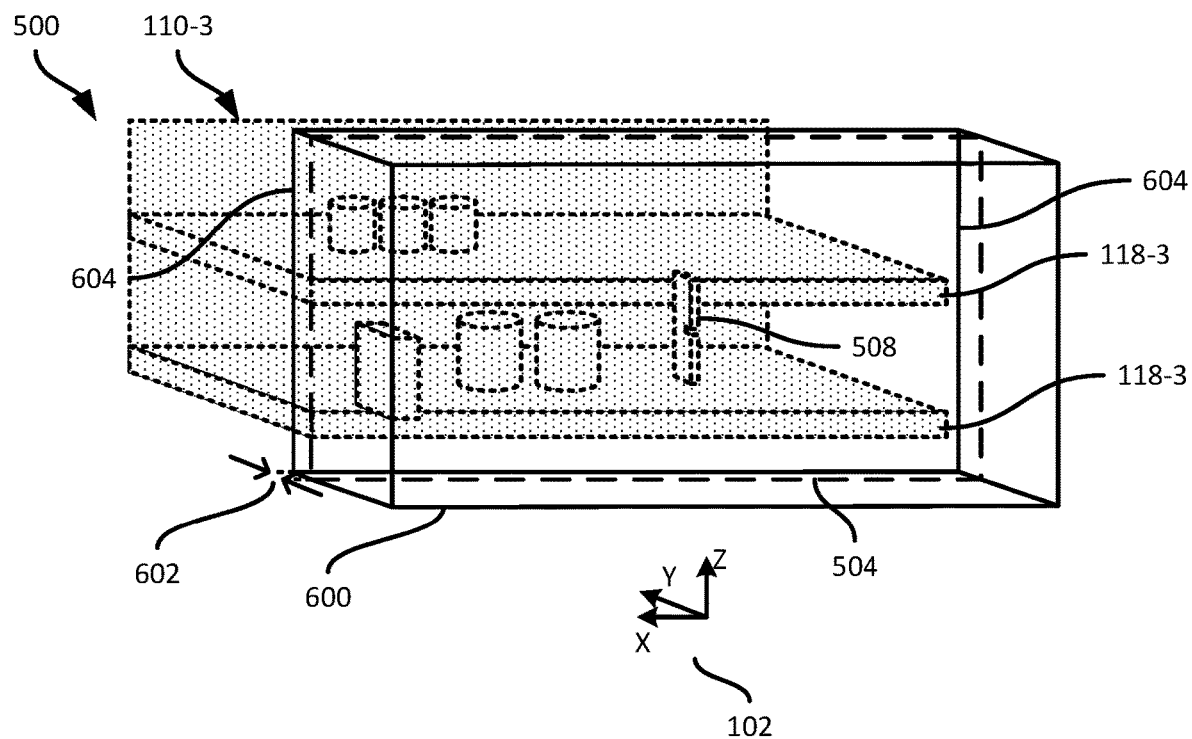
FIG. 6 is a diagram illustrating an obstruction region selected from the point cloud of FIG. 5 for further processing.

Referring to FIG. 6, the point cloud 500 is illustrated, with an obstruction region 600 indicated. The obstruction region 600 is a region in which obstructions detectable via the method 400 (such as the clip strip 508) are expected to be present. The obstruction region 600 extends behind the shelf plane 504 by a predefined depth 602 (e.g. 2 cm, although a wide variety of other depths may also be employed). In the discussion herein, the terms "behind" or "backward" refer to locations at greater depths along the Y axis of the frame of reference 102 from the illustrated origin of the frame of reference 102. Conversely, the terms "in front" or "forward" refer to locations at smaller depths from the origin of the frame of reference 102. The obstruction region 600 also extends forward of the shelf plane 504, either by a predetermined distance, or simply to include any and all points of the point cloud 500 that are in front of the shelf plane 504. Any points behind the back surface 604 of the obstruction region 600 are ignored for the remainder of the performance of the method 400.

Selection of the set of points in the obstruction region 600 can also include eliminating any points in the point cloud 500 that extend beyond ends of an aisle of shelf modules 110. For example, the server 101 can either detect the ends of the aisle (e.g. by detecting vertical structures such as poles that typically occur at the ends of the aisle), or can retrieve known coordinates in the frame of reference 102 of the aisle ends. The obstruction region 600 is then defined to exclude points beyond the aisle ends.

Figure 7:
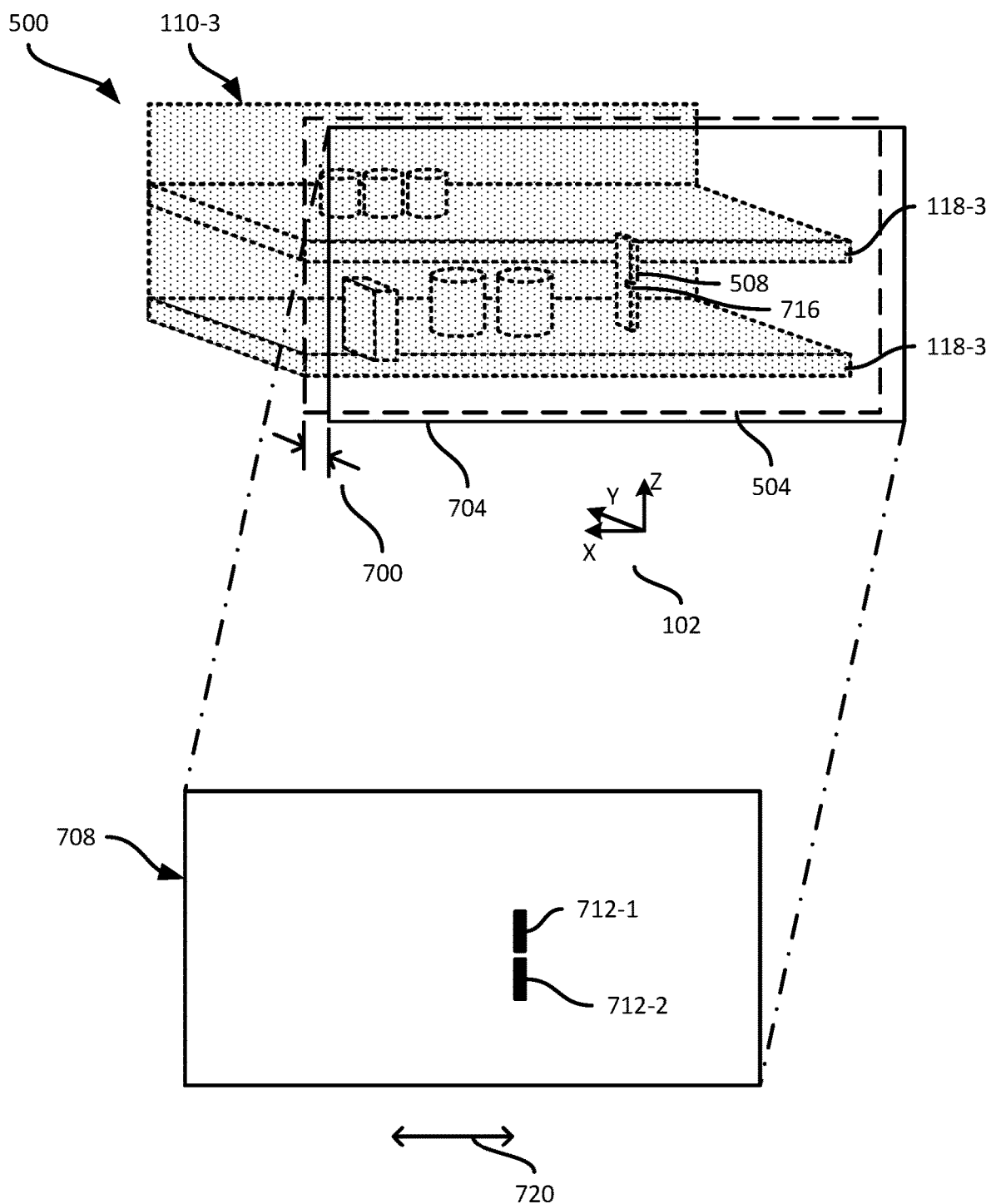
FIG. 7 is a diagram illustrating an example performance of block 420 of the method of FIG. 4.

Returning to FIG. 4, the server 101 then processes the selected set of points from the point cloud according to a plurality of selection depths, to detect obstacles such as the clip strip 508. In particular, at block 415, the server 101 sets a selection depth according to a coarse interval. Specifically, the selection depth set at block 415 is set by decrementing the depth of the shelf plane 504 by the coarse interval. An example performance of block 415 is illustrated at FIG. 7. Specifically, a coarse interval 700 is illustrated, and a selection depth 704 is defined as a plane parallel to the shelf plane 504 and located at a depth that is shifted forward from the shelf plane 504 by the coarse interval 700. Any points in front of the selection depth 704 are selected in the subset at block 415. A variety of coarse intervals can be employed, for example depending on the expected size of the obstructions. In the present example, the coarse interval is about 6 cm, although other coarse intervals smaller than, or larger than, 6 cm may be employed in other embodiments.

At block 420, the server 101 projects the selected subset of points to a two-dimensional image, and detects obstruction candidates in the projection. Returning to FIG. 7, a projection 708 is shown of all points in front of the selection depth 704. To detect obstruction candidates, the server performs a suitable blob detection operation (e.g. connected components analysis or the like) on the projection 708, to identify contiguous sets of points in the projection 708 that indicate the presence of a physical object. As shown in FIG. 7, the projection 708 contains two candidate obstructions 712-1 and 712-2. The server 101 may store indications of the candidate obstructions 712-1 and 712-2, such as two-dimensional bounding boxes indicating the extents of each candidate obstruction 712. As will be apparent to those skilled in the art, the candidate obstructions 712 correspond to pieces of the clip strip 508, whose forward portion has a notch 716 that results in the clip strip 508 appearing as two distinct objects at the selection depth 704.

Referring again to FIG. 4, at block 425 the server 101 determines whether candidate obstructions remain to be processed. The determination in the present example is affirmative, because the candidate obstructions 712 have not yet been processed. The performance of the method 400 therefore proceeds to block 430. At block 430, the server 101 selects the next unprocessed candidate obstruction 712 (e.g. the candidate obstruction 712-1) and determines whether the candidate obstruction satisfies a decision criterion, reflecting whether sufficient information is available to confirm or discard the obstruction candidate. The decision criterion, in the present example, is a dimensional criterion. In the present example, the dimensional criterion is a width threshold, illustrated as the width 720 in FIG. 7. The dimensional criterion reflects a predetermined assumption about the physical structure of the obstructions. In the present example, the obstructions are expected to have a relatively small width (i.e. dimension in the X axis of the frame of reference 102), in comparison to the width of the shelf module 110. As will be apparent from FIG. 7, the candidate obstruction 712-1 does not satisfy the dimensional criterion, and the determination at block 430 is therefore negative.

Following a negative determination at block 430, the server 101 returns to block 425 to determine whether any unprocessed candidate obstructions remain. In the present example, the determination is again affirmative, and at block 430, the server 101 determines that the obstruction candidate 712-2 also does not satisfy the dimensional criterion. Following assessment of the obstruction candidate 712-2, the determination at block 425 is negative, and the performance of the method 400 proceeds to block 435.

At block 435, the server 101 determines whether any selection depths remain to be processed. As noted above, the server 101 processes the selected set of points from the point cloud 500 according to a plurality of selection depths. The selection depths are defined by the above-mentioned coarse interval, as well as a fine interval. Specifically, the first selection depth is defined by decrementing (that is, moving forward) the depth of the shelf plane 504 by the coarse interval, as described above. Each subsequent selection depth is defined by incrementing (that is, moving backward) the previous selection depth by the fine interval.

Figure 8:
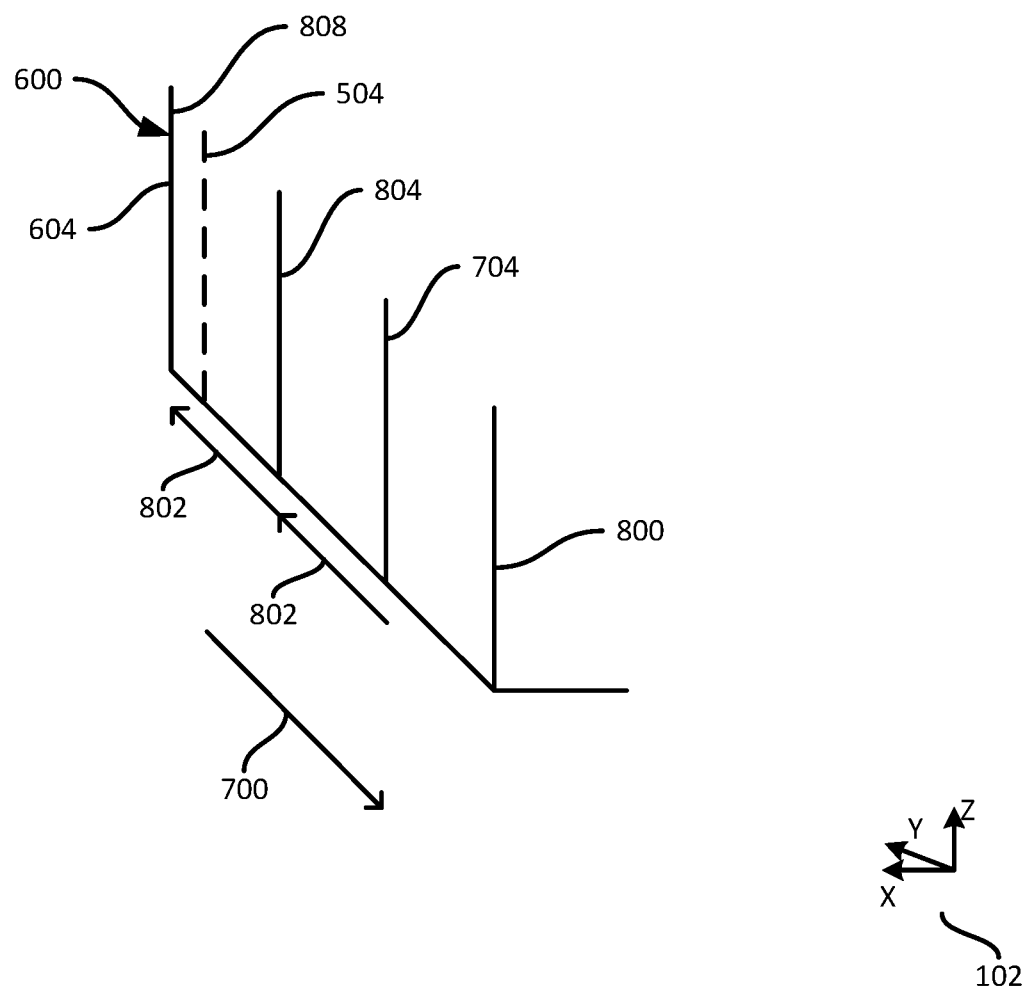
FIG. 8 is a diagram illustrating a series of selection depths employed in the method of FIG. 4.

Turning to FIG. 8, a set of example selection depths are illustrated, along with the shelf plane 504 and the obstruction region 600 employed to select the initial set of points at block 410. In particular, the selection depth 704 is shown as having been obtained by decrementing the depth of the shelf plane 504 by the coarse interval 700 discussed earlier. At block 415, therefore, any points with depths between the selection depth 704 and a front 800 of the obstruction region 600 are processed.

Each subsequent selection depth is set by incrementing the current selection depth by a fine interval 802. Thus, the second selection depth in the present example is a selection depth 804. When processing the point cloud 500 using the selection depth 804, any points between the selection depth 804 and the front 800 of the obstruction region 600 are processed. Further, in the present example performance of the method 400, a third selection depth 808 corresponding to the back 604 of the obstruction region 600 is also employed. Thus, when processing the point cloud 500 using the selection depth 808, any points between the selection depth 808 and the front 800 of the obstruction region 600 are processed.

Any suitable number of selection depths may be employed in the performance of the method 400, including a greater number of selection depths than the three illustrated in FIG. 8. The fine interval 802 can be predefined (e.g. as 6 mm, although larger or smaller fine intervals may also be employed in other embodiments), or can be determined dynamically by the server 101. For example, the server 101 can determine the fine interval 802 by dividing the depth between the back 604 of the obstruction region 600 and the first selection depth (e.g. 704) by a predetermined number of desired selection depths.

Other mechanisms may also be implemented to set the various selection depths employed in the performance of the method 400. For example, rather than setting the initial selection depth with the coarse interval 700 and setting subsequent selection depths with the fine interval 802, the server 101 can set each selection depth by decrementing the back 604 of the obstruction region 600 by successive multiples of the fine interval 802. In other embodiments, the selection depths can be predefined for each module 110 in the memory 122, and the server 101 therefore need only retrieve the selection depths from the memory 122.

As will now be apparent, the specific nature of the determination at block 435 may depend on the mechanism by which the selection depths are set. In the present example, at block 435 the server 101 determines whether the current selection depth (i.e. the selection depth most recently processed at block 420) is equal to or greater than the depth of the shelf plane 504. In other embodiments the server 101 can determine whether a configurable number of selection depths has been processed.

In the present example, the determination at block 435 is affirmative, because the selection depth 704 is not equal to or greater than the depth of the back 604 of the obstruction region 600. Therefore, at block 440 the server 101 expands the selected subset by setting a new selection depth according to the mechanism described above. Specifically, the updated selection depth set at block 440 is the selection depth 804 shown in FIG. 8. The subset of points to be processed has therefore been expanded to include any points with depths between the selection depth 804 and the front 800 of the obstruction region 600. The server then returns to block 420.

Figure 9:
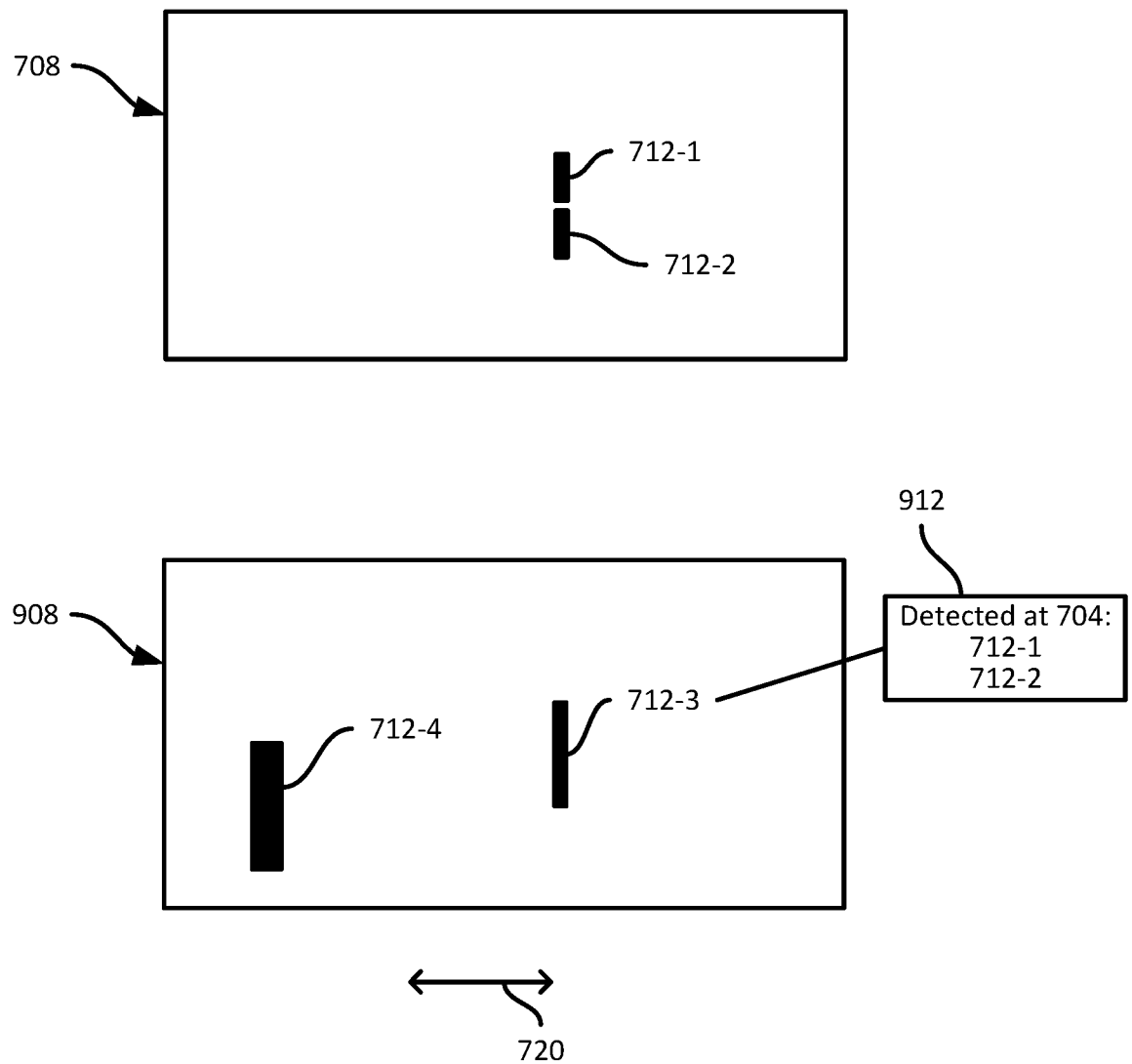
FIG. 9 is a diagram illustrating a further example performance of block 420 of the method of FIG. 4.

In a further performance of block 420, the server 101 projects the selected subset of points (which now includes both the initial subset and the additional points between the selection depths 804 and 704) to two dimensions, and detects obstruction candidates as discussed above. Turning to FIG. 9, the projection 708 is shown along with a projection 908 generated at the second performance of block 420. In the projection 908, obstruction candidates 712-3 and 712-4 are detected, corresponding respectively to the clip strip 508 and the product 112-1 shown in FIG. 5.

At block 420, the server 101 also determines whether any obstruction candidates detected at the current selection depth overlap with previously detected obstruction candidates. Thus, at block 420 the server 101 determines whether either of the obstruction candidates 712-3 and 712-4 overlap with either of the obstruction candidates 712-1 and 712-2 from the projection 708. As will be apparent, the obstruction candidate 712-3 overlaps with both the obstruction candidates 712-1 and 712-2. That is, the obstruction candidate 712-3 represents an additional portion of the clip strip 508.

When obstruction candidates overlap, as with the obstruction candidate 712-3, the server 101 updates the obstruction candidate 712-3 to indicate previous detections. The indication of previous detections can include metadata, a copy of the projection 708, or the like. In the present example, the server 101 stores an indicator 912 in association with the projection 908, indicating that the obstruction candidate 712-3 corresponds to previously detected obstruction candidates 712-1 and 712-2. In other words, overlapping obstruction candidates 712 from different selection depths are tracked as single objects throughout the performance of the method 400.

Referring again to FIG. 4, the determination at block 430 is negative for both the obstruction candidates 712-3 and 712-4, and the server 101 thus proceeds to block 435. The determination at block 435 is again affirmative, and a final selection depth is set at block 440, corresponding to the selection depth 808 shown in FIG. 8.

Figure 10:
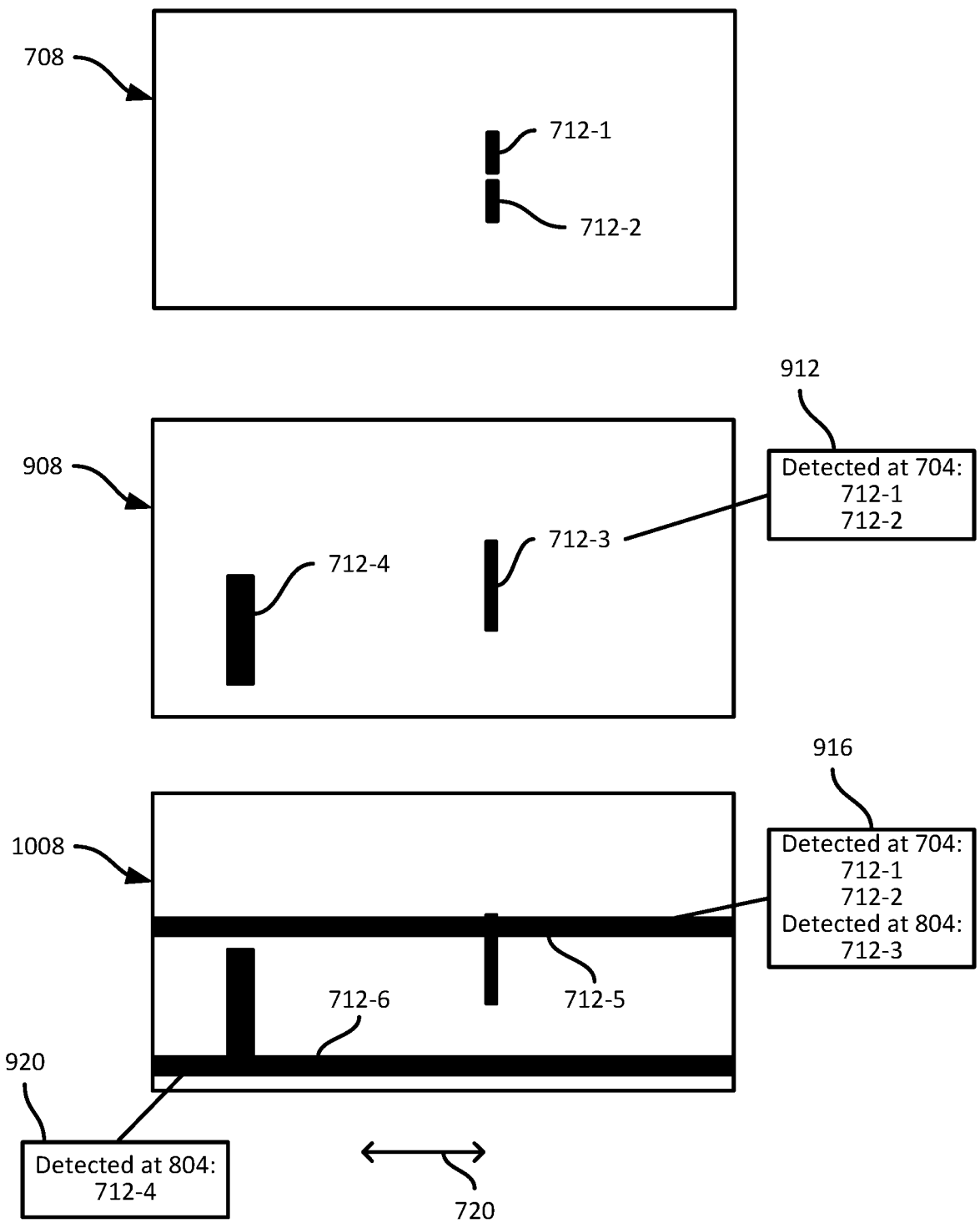
FIG. 10 is a diagram illustrating a further example performance of block 420 of the method of FIG. 4.

Turning to FIG. 10, the projections 708 and 908 are shown, as well as a projection 1008 resulting from a performance of block 420 at the selection depth 808. As seen from FIG. 8, the selection depth 808 is behind the shelf plane 504, and the shelf edges 118-3 are therefore visible in the projection 1008. The projection 1008 therefore includes detected obstruction candidates 712-5 and 712-6 that include the shelf edges 118-3 as well as the clip strip 508 and the product 112-1, respectively. The server 101 also stores indications 916 and 920 as shown in FIG. 10, indicating previous detections of overlapping obstruction candidates.

The determination at block 430 for each of the obstruction candidates 712-5 and 712-6 is affirmative, because the widths of the obstruction candidates 712-5 and 712-6 both exceed the width threshold 720. The server 101 therefore proceeds to block 445 for each of the obstruction candidates 712-5 and 712-6. At block 445, the server 101 determines whether the obstruction candidate meets a confirmation criterion. Specifically, in the present embodiment the server 101 determines whether the obstruction candidates 712-5 and 712-6 have been detected at a threshold number of previous selection depths.

The obstruction candidate 712-5, according to the indicator 916, has been detected at two previous selection depths (the selection depths 704 and 804). The obstruction candidate 712-6, on the other hand, has been detected at only one previous selection depth, as shown in the indicator 920. Assuming the threshold number of previous detections is two, the determination at block 445 is therefore affirmative for the obstruction candidate 712-5, and negative for the obstruction candidate 712-6.

Following a negative determination at block 445, the server 101 discards the obstruction candidate 712-6, as well as any stored earlier candidates corresponding to the candidate 712-6 (i.e. the candidate 712-4 in the present example). Following an affirmative determination at block 445, however, the server 101 confirms the obstruction candidate. In particular, the server 101 retrieves the bounding box or other indication of the previous detection corresponding to the candidate 712-5 (so as to not include the shelf edge 118-3 in the bounding box), and labels the bounding box as a confirmed obstruction.

Following the performance of blocks 450 and 455, and negative determinations at block 425 and 435, the server 101 proceeds to block 460. At block 460 the server 101 stores the confirmed obstruction candidates in the memory 122, and may also present, as output of the obstruction detection process, the confirmed obstruction candidates to another computing device, another application executed by the server 101, or the like.

Storing the confirmed obstruction candidates includes converting the two-dimensional bounding boxes obtained from the projections discussed above into three-dimensional bounding boxes according to the frame of reference 102. Conversion of the two-dimensional projections into three-dimensional bounding boxes can include, for example, generating a three-dimensional bounding box having a rear face at a depth corresponding to the final obstruction candidate before the dimensional criterion was satisfied at block 430, and a forward face at a depth corresponding to the first detection of the obstruction. Thus, in the present example, a three-dimensional bounding box is generated for the obstruction candidates 712-1, 712-2 and 712-3 with a rear face at the selection depth 804 and a forward face at the selection depth 704.

Figure 11:
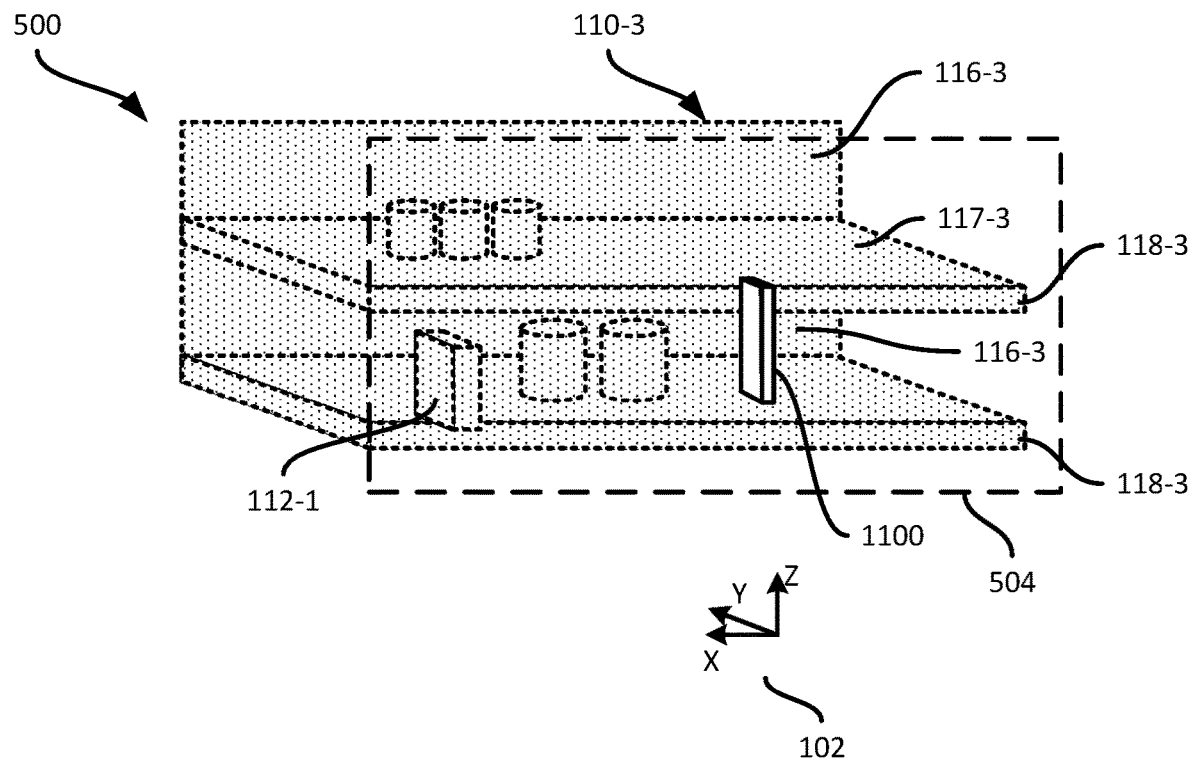
FIG. 11 is a diagram illustrating an example performance of block 460 of the method of FIG. 4.

In other examples, generation of the three-dimensional representations of confirmed obstruction candidates is performed by retrieving the three-dimensional coordinates of points corresponding to the obstruction candidates 712-1, 712-2 and 712-3, and fitting a bounding box to those points. FIG. 11 illustrates an example three-dimensional bounding box 1100 indicating the position of the obstruction candidates 712-1, 712-2 and 712-3 (which corresponds to the position of the clip strip 508 as shown in FIG. 5).

As will now be apparent, the repeated performance of blocks 420, 425, 430, 445, 450 and 455 for a plurality of selection depths results in candidate obstructions at each selection depth either being labelled as a confirmed obstruction, discarded, or stored as neither confirmed nor discarded (for further evaluation at the next selection depth).

In some embodiments, additional confirmation criteria can be applied instead of, or in addition to, the number of detections assessed at block 445 to determine whether obstruction candidates are confirmed or discarded. For example, a minimum height threshold (i.e. a dimension along the Z axis of the frame of reference 102) can be specified following an affirmative determination at block 445, such that obstruction candidates that do not meet the minimum height are discarded. Such a minimum height threshold can also occur instead of block 445, such that a candidate obstruction meeting the minimum height threshold is confirmed regardless of the number of times the candidate obstruction was detected. In yet additional embodiments, the predetermined obstruction criteria include one or more of the following: a predetermined obstruction size range (e.g., maximum and minimum obstruction dimensions), a predetermined obstruction shape (e.g., a shape corresponding to a clip strip or other expected obstructions in front of the shelf), a predetermined orientation and/or range of orientations of the obstruction (e.g., maximum and minimum values corresponding to an orientation of expected obstructions with respect to one or more surfaces of the shelf, such as with respect to the shelf edge and/or back of the shelf), among others. In further embodiments, other decision criteria can be employed at block 430, instead of or in addition to the above-mentioned dimensional criterion. For example, in another embodiment the determination at block 430 is affirmative if either the dimensional criterion is met or if no further selection depths remain to be processed. That is, even if the dimensional criterion is not met by a candidate obstruction, the server 101 proceeds to block 445 to confirm or discard the candidate obstruction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in an imaging controller of detecting data capture obstructions on a front of a support structure, the method comprising:
obtaining (i) a point cloud of the support structure and a data capture obstruction disposed on the front of the support structure, and (ii) a support structure plane corresponding to the front of the support structure;
for each of a plurality of selection depths:
selecting a subset of points from the point cloud based on a selection depth;
detecting obstruction candidates associated with the data capture obstruction from the subset of points and, for each obstruction candidate:
responsive to determining that a dimension of the obstruction candidate meets a dimensional criterion, determining whether the obstruction candidate meets a confirmation criterion;
when the obstruction candidate meets the confirmation criterion, identifying the obstruction candidate as the data capture obstruction; and
presenting obstruction detection output data including the data capture obstruction.

2. The method of claim 1, wherein determining whether the obstruction candidate meets the confirmation criterion includes at least one of:
determining whether the obstruction candidate exceeds a minimum obstruction dimension;
determining whether the obstruction candidate has a predetermined obstruction shape; and
determining whether the obstruction candidate has a predetermined obstruction orientation.

3. The method of claim 1, wherein determining whether the obstruction candidate meets the confirmation criterion includes determining whether the obstruction candidate has been detected at a threshold number of previous selection depths.

4. The method of claim 3, further comprising:
when the obstruction candidate has not been detected at the threshold number of previous selection depths, discarding the obstruction candidate.

5. The method of claim 1, further comprising:
responsive to the dimensional criterion not being met, storing the obstruction candidate in the memory for evaluation at a subsequent selection depth.

6. The method of claim 1, further comprising:
selecting a set of points from the point cloud corresponding to an obstruction region;
wherein the subset of points is selected from the obstruction region.

7. The method of claim 1, further comprising setting the selection depths by:
decrementing a depth of the support structure plane by a coarse interval to set a first selection depth; and
incrementing the first selection depth by a fine interval to set a second selection depth.

8. The method of claim 1, wherein selecting the subset of points includes selecting the points having depths smaller than the selection depth.

9. The method of claim 1, wherein detecting obstruction candidates comprises:
generating a two-dimensional projection of the selected subset of points;
detecting contiguous sets of points in the projection; and
generating a bounding box corresponding to each contiguous set.

10. The method of claim 9, wherein detecting obstruction candidates further comprises:
determining whether the bounding box overlaps with a previously detected obstruction candidate; and
when the bounding box overlaps with a previously detected obstruction candidate, storing an indication of the previously detected obstruction candidate with the bounding box.

11. The method of claim 1, wherein the dimensional criterion is a threshold width.

12. A computing device, comprising:

a memory;

an imaging controller connected with the memory, the imaging controller configured to:
  obtain (i) a point cloud of the support structure and a data capture obstruction disposed on a front of the support structure, and (ii) a support structure plane corresponding to the front of the support structure;
  for each of a plurality of selection depths:
    select a subset of points from the point cloud based on a selection depth;
    detect obstruction candidates associated with the data capture obstruction from the subset of points and, for each obstruction candidate:
      responsive to determining that a dimension of the obstruction candidate meets a dimensional criterion, determine whether the obstruction candidate meets a confirmation criterion;
      when the obstruction candidate meets the confirmation criterion, identify the obstruction candidate as the data capture obstruction; and
  present obstruction detection output data including the data capture obstruction.

13. The computing device of claim 12, wherein the imaging controller is configured, in order to determine whether the obstruction candidate meets the confirmation criterion, to at least one of:
  determine whether the obstruction candidate exceeds a minimum obstruction dimension;
  determine whether the obstruction candidate has a predetermined obstruction shape; and
  determine whether the obstruction candidate has a predetermined obstruction orientation.

14. The computing device of claim 12, wherein the imaging controller is configured, in order to determine whether the obstruction candidate meets the confirmation criterion, to determine whether the obstruction candidate has been detected at a threshold number of previous selection depths.

15. The computing device of claim 12, wherein the imaging controller is further configured to:
  when the obstruction candidate has not been detected at the threshold number of previous selection depths, discard the obstruction candidate.

16. The computing device of claim 12, wherein the imaging controller is further configured to:
  responsive to the dimensional criterion not being met, store the obstruction candidate in the memory for evaluation at a subsequent selection depth.

17. The computing device of claim 12, wherein the imaging controller is further configured to:
  select a set of points from the point cloud corresponding to an obstruction region;
  wherein the subset of points is selected from the obstruction region.

18. The computing device of claim 12, wherein the imaging controller is further configured, in order to set the selection depths, to:
  decrement a depth of the support structure plane by a coarse interval to set a first selection depth; and
  increment the first selection depth by a fine interval to set a second selection depth.

19. The computing device of claim 12, wherein the imaging controller is further configured, in order to select the subset of points, to select the points having depths smaller than the selection depth.

20. The computing device of claim 12, wherein the imaging controller is further configured, in order to detect obstruction candidates, to:
  generate a two-dimensional projection of the selected subset of points;
  detect contiguous sets of points in the projection; and
  generate a bounding box corresponding to each contiguous set.

21. The computing device of claim 20, wherein the imaging controller is further configured, in order to detect obstruction candidates, to:
  determine whether the bounding box overlaps with a previously detected obstruction candidate; and
  when the bounding box overlaps with a previously detected obstruction candidate, store an indication of the previously detected obstruction candidate with the bounding box.

22. The computing device of claim 12, wherein the dimensional criterion is a threshold width.

23. A method in an imaging controller of detecting data capture obstructions disposed on a front of a support structure, the method comprising:
  obtaining a point cloud of the support structure;
  selecting a plurality of point subsets based on respective selection depths;
  detecting obstruction candidates associated with the data capture obstructions in each point subset and, for each obstruction candidate:
    responsive to a decision criterion being met, determining whether the obstruction candidate meets a confirmation criterion;
    when the obstruction candidate meets the confirmation criterion, identifying the obstruction candidate as a confirmed data capture obstruction; and
  presenting obstruction detection output data including the confirmed data capture obstructions in a memory.

* * * * *